Sept. 18, 1928.
S. R. GARNER, SR
1,684,985
BATTERY TERMINAL AND CABLE CLAMP
Filed Sept. 4, 1925
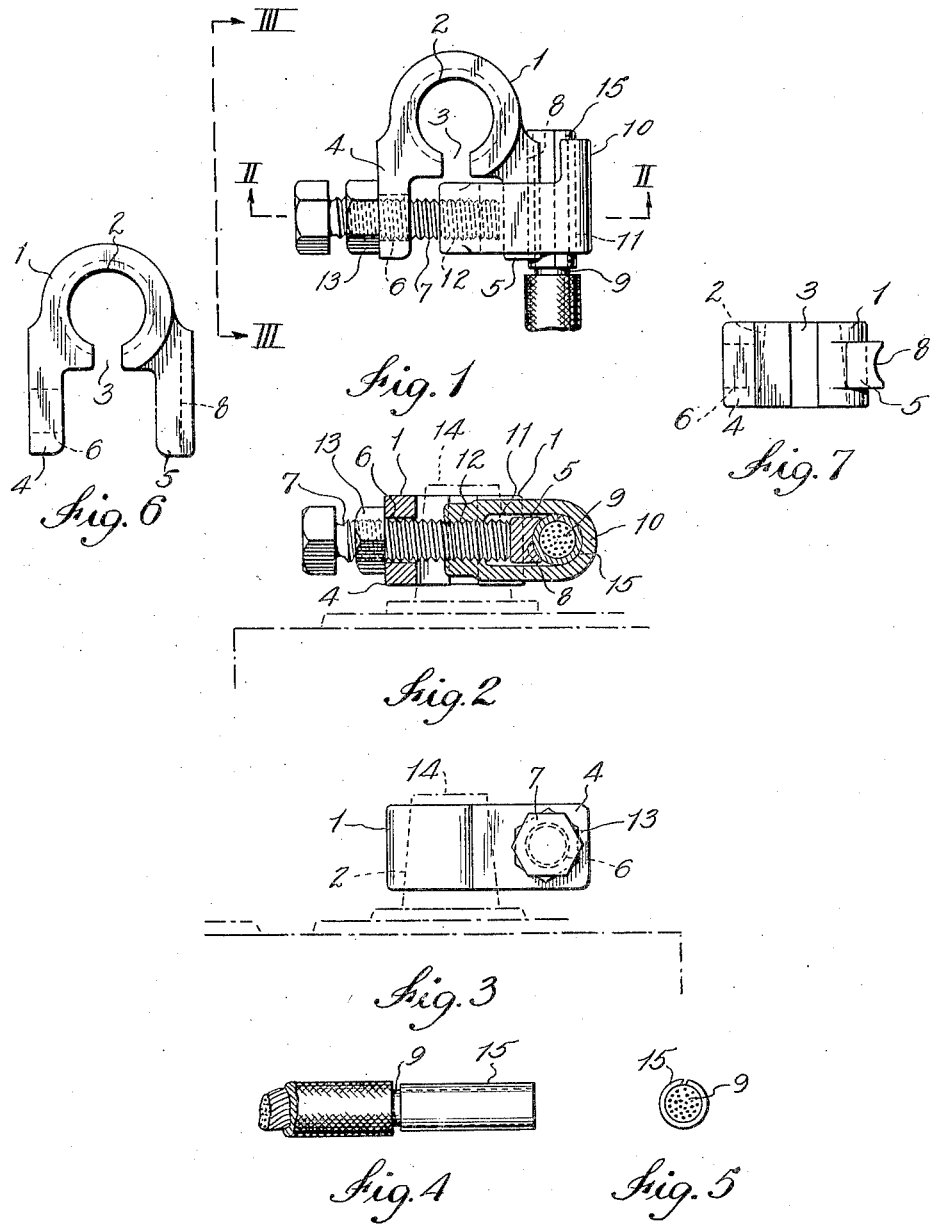
Inventor:
SAMUEL R. GARNER SR.
BY
ATTORNEY Patented Sept. 18, 1928.

1,684,985

UNITED STATES PATENT OFFICE.

SAMUEL R. GARNER, SR., OF CLEVELAND, OHIO.

BATTERY TERMINAL AND CABLE CLAMP.

Application filed September 4, 1925. Serial No. 54,500.

My invention relates particularly to means for attaching wires or cables to the terminals of storage batteries such as are commonly used in the operation of automobiles and radio apparatus.

The ordinary means for attaching a cable to a battery terminal consists of a clamp attached to the end of the cable either by soldering or by a set screw and adapted to be clamped to the battery terminal by means of a flanged-head screw which must be completely unscrewed and removed when connecting or disconnecting the battery. This type of clamp is difficult to attach or detach, cannot easily be changed from one cable or one battery to another and the clamping screw is frequently lost or misplaced causing loss of time and annoyance.

Among the objects of my invention are the provision of a clamp which may be easily attached both to the cable and to the battery terminal; the provision of a clamp which requires no soldering for making connections either to the cable or the battery terminal; the provision of a clamp having only one screw and a nut for tightening and adjusting the connections to both the battery terminal and the cable; the provision of a clamp which can be detached from the battery terminal without disturbing its grip on the cable; the provision of a clamp that permits the removal of an old cable and the installation of a new one without removing the clamp from the battery terminal; the provision of a clamp that may be changed from one battery terminal to another without removing the cable from the clamp; the provision of a clamp that may be used with different sizes of cables or wires; the provision of a clamp that may be operated without removing any part of it; and the provision of an inexpensive, rugged means for making connections between battery terminals and the conductors leading to them.

The foregoing and other objects are accomplished by the use of my invention described herein and shown in the accompanying drawings in which Fig. 1 is a plan view of a battery terminal and cable clamp embodying my invention showing the cable in position;

Fig. 2 is a vertical cross-section on line II—II of Fig. 1 with battery terminal shown in dotted outline;

Fig. 3 is a side elevation of the battery terminal and cable clamp shown in Figs. 1 and 2;

Fig. 4 is a fragmentary view of a cable with the insulation removed at the end and a yielding metal sheath surrounding the conductor;

Fig. 5 is an end view of the cable showing the scarfed joint of the sheath;

Fig. 6 is a plan and

Fig. 7 is an end elevation of the battery terminal clamp.

Referring to the drawings, 1 is a battery terminal clamp composed of a sleeve portion having an aperture 2 adapted to fit the battery terminal. The clamp 1 is split longitudinally at 3 to permit the contraction of the sleeve to clamp the battery terminal. Arms 4 and 5 are provided upon respectively opposite sides of the slot 3. Arm 4 has an unthreaded aperture 6 of sufficient size to permit the clamping screw 7 to pass freely through it. Arm 5 preferably has a grooved face 8, forming an abutment against which the cable conductor 9 may be clamped.

10 is a cable clamp provided with an aperture 11 adapted to loosely receive the arm 5 of clamp 1 and the conductor cable 9. A threaded aperture 12 is provided in cable clamp 10 and the screw 7 is threaded into this aperture. A nut 13 on the screw 7 co-acts with the screw and cable clamp 10 to contract the clamp 1 upon the battery terminal 14.

In the use of my invention the conductor cable 9 is clamped against the arm 5 of battery terminal clamp 1 by means of cable clamp 10 and screw 7, the end of which abuts against the inner side of arm 5 to draw the clamp 10 across arm 5 and thereby grip the cable. The battery terminal 14 is clamped by drawing together arms 4 and 5 and contracting the sleeve of clamp 1 by means of nut 13 upon screw 7.

To remove the clamp 1 from the battery terminal 14, the nut 13 may be loosened without loosening the screw 7 and the clamp 1 may then be removed from the terminal 14 without loosening the cable 9. The cable 9 may be removed from the clamp by loosening the screw 7. In this case the clamp 1 will be also loosened due to the slackening of the pressure of clamp 10 but the clamp 1 may remain upon the battery terminal while the cable 9 is removed.

It is not necessary to completely unscrew screw 7 from clamp 10 to operate my invention, all parts of which may be assembled at the factory, ready to use without disassembling.

All of the parts of my battery terminal and cable clamp may be lead covered as is customary for storage battery terminals. I prefer that the head of the screw 7 be made the same size and shape as the nut 13 so that the same wrench may be used for operating either of them, but it is obvious that any suitable screw may be used and that it may be provided with a screw-driver slot if desired.

In Figs. 4 and 5 the insulated cable 9 is shown with the insulation removed from one end and the scarfed metal sleeve 15 encompassing the stranded conductors of the cable.

It will be observed that the cable clamp 10 is adapted to clamp either stranded or solid conductors of suitable size to enter the aperture formed between the clamp 10 and the arm 5 and be clamped within the range of adjustment of the clamp 10 relative to the arm 5.

It will be observed that my invention accomplishes its stated objects, that its construction is simple, easily operated and inexpensive and that it is strong and durable.

I claim—

1. A battery terminal and cable clamp comprising a split sleeve having arms extending outwardly, one on each side of the split, one of said arms being adapted to form an abutment for an electrical conductor, the other of said arms having an unthreaded aperture adapted to loosely receive the shank of a clamping screw, a cable clamp loosely fitting over said first named arm adapted to clamp an electrical conductor to said first named arm, said cable clamp having a threaded aperture, a clamping screw in said threaded aperture adapted to abut against said first named arm to draw said cable clamp toward it to clamp said electrical conductor, said screw passing freely through said unthreaded aperture, and a nut on said screw adapted to engage said second named arm and co-act with said screw and said cable clamp to draw said arms toward each other to contract said sleeve.

2. In a battery terminal and cable clamp a split sleeve adapted to receive a battery terminal, said sleeve having an extension adjacent one side of the split in said sleeve adapted to form an abutment for one side of an electrical conductor, said sleeve having a second extension adjacent the other side of the split in said sleeve, a conductor clamp encompassing said first named extension and adapted to receive a conductor between said first named extension and the wall of said clamp, means co-acting with said first named extension and said conductor clamp to clamp said conductor therebetween, and means co-acting with said extensions and said conductor clamp to contract said sleeve.

3. A battery terminal and conductor clamp comprising a split sleeve adapted to receive a battery terminal and having two arms, one extending on one side and the other extending on the other side of the split in said sleeve, one of said arms having an aperture and the other of said arms being adapted to form an abutment for a conductor, screw means extending freely through said aperture adapted to abut against that one of said arms that forms said conductor abutment, a conductor clamping member encompassing said conductor abutment arm and having a threaded aperture adapted to receive said screw means whereby when said screw means is screwed against said conductor abutment arm, said conductor clamp is tightened, and a nut on said screw adapted to be screwed against said apertured arm and co-act with said screw and said conductor clamp to contract said split sleeve.

SAM'L R. GARNER, Sr.